United States Patent [19]
Hallay

[11] 3,921,032
[45] Nov. 18, 1975

[54] THERMAL REGULATOR BALLAST
[75] Inventor: Alexander Robert Hallay, Danville, Ill.
[73] Assignee: General Electric Company, Indianapolis, Ind.
[22] Filed: Feb. 10, 1975
[21] Appl. No.: 548,433

Related U.S. Application Data
[63] Continuation-in-part of Ser. No. 412,167, Nov. 2, 1973, abandoned.

[52] U.S. Cl. ............ 315/106; 315/DIG. 5; 315/309
[51] Int. Cl.² ........................................ H05B 41/36
[58] Field of Search ...... 315/DIG. 5, 100, 104, 106, 315/107, 309

*Primary Examiner*—James B. Mullins

[57] ABSTRACT

A ballast for regulating current through at least one gaseous discharge lamp responsive to thermal conditions around the ballast. A capacity circuit including a power capacitance is utilized to provide at least a part of the current regulation. The capacity circuit is responsive to a change in temperature and is capable of switching either abruptly or gradually from one capacitance level to another capacitance level. The impedance of the capacity circuit is therefore increased as the temperature increases thereby limiting current through the at least one gaseous discharge lamp during a high temperature situation. Furthermore, this decrease in current has little, if any, overall effect on the light output of the lamp.

15 Claims, 10 Drawing Figures

THERMAL REGULATOR BALLAST

This is a continuation-in-part of application Ser. No. 412,167 filed Nov. 2, 1973, now abandoned.

BACKGROUND OF THE INVENTION

There is provided a ballast circuit for thermal regulation of at least one gaseous discharge lamp. More particularly there is provided a ballast including a capacity circuit which may be switched from one capacitance level to another capacitance level in response to a temperature change.

In the fluorescent ballast art, it is desirable to operate at case temperatures no greater than 90° to 95°C. Temperatures much greater than this cause reduced life, sometimes cause noise, and may cause other problems related to excessive temperatures.

Several means have been employed to provide thermal protection for ballasts. One of these is known as a single shot end of life thermal protector. This protector could be placed in a circuit relationship with the core and coil and/or the ballast capacitor so that if the temperature of the ballast or its surroundings became too high then the ballast would be taken out of the line. That is, the circuit would be open. However, once the circuit is opened the ballast is generally removed permanently from the line.

Recycling protectors also have been used and are widely used in the motor industry. They allow the circuit to open during a temperature overload and reclose after the temperature lowers. However, these types of devices are less reliable than the single shot technique and are more expensive. Furthermore, recycling protectors cause the lamp to switch off thereby darkening the room and also shortening lamp life.

When a new building is under construction, a lighting system is one of the first things to be installed inside the building so that the workmen can see to do their work. Quite often the lighting system employes gaseous discharge lamps, e. g., fluorescent type, which require ballasts. These installations usually occur long before the air conditioning or other ventiliation systems are actuated. Under these conditions it is not uncommon for the combination of the ballast heat, the fixture heat and the air in the unairconditioned room to cause ballast case temperatures to exceed 110°C whereas fluorescent ballasts should normally operate between 90°and 95°C. This would cause a single shot protector to trigger and the ballast would have to be replaced. It is therefore desirable to provide a thermal regulation means whereby the ballast case temperature is thermally regulated rather than taken out of the line when the temperature exceeds a predetermined value.

Using ballasts operating fluorescent lamps on an average lighting fixture, only about 20% of the input power is dissipated in the ballast itself. Approximately 10% of the power is liberated as visible light. The remaining 70% of the input power appears as heat liberated by the lamp within the fixture. Therefore the primary source of ballast case heat and fixture heat comes from the lamps themselves. The most effective means, therefore, for controlling the ballast thermal environment is to control the power dissipated in the lamps. one might believe that to reduce the power in a lamp would cause the light output of the lamp to also be reduced. However, between certain temperature ranges, this is not true.

FIG. 7 shows a curve relating the light output of a typical fluorescent lamp to the ambient temperature. It can be seen that it is a characteristic of this fluorescent lamp having fixed input power to operate at maximum light output near 25°C ambient and at lower light outputs on either side of the 25°C point. It follows, therefore, that if a decrease in ambient temperature around the lamp from 70° to 25°C results in a 20% increase in light output, then the light losses caused by the lowering of lamp power a certain percentage could nearly be compensated for because of the lamp characteristic.

OBJECTS OF THE INVENTION

One of the objects of the invention is to provide a thermally regulated ballast circuit.

Another object is to provide a ballast circuit having a capacity circuit whereby the capacitance substantially changes in response to a change in ambient temperature.

Another object is to provide a ballast circuit having a capacity circuit for increasing the ballast circuit impedance in response to an increase in ambient temperature with little effect on light output.

Still another object is to provide a thermally regulated ballast operating near normal temperatures for providing a long ballast life.

SUMMARY OF THE INVENTION

In accordance with one form of this invention there is provided a ballast circuit for regulating the current through at least one gaseous discharge lamp over a range of ambient temperatures. A pair of input leads connect the ballast circuit to a source of operating power. A transformer is connected to the input leads. A capacity circuit including a power capacitance is connected between the transformer and at least one lamp. The capacity circuit further includes a means for varying the total effective capacitance of the capacity circuit responsive to the ambient temperature whereby lamp power is substantially decreased in response to an increase in ambient temperature.

BRIEF DESCRIPTION OF THE DRAWINGS

The subject matter which is regarded as the invention is set forth in the appended claims. The invention itself, however, together with further objects and advantages thereof may be better understood by reference to the following description taken in conjunction with the accompanying drawings in which:

DESCRIPTION OF THE PREFERRED EMBODIMENTS

Figure 1:
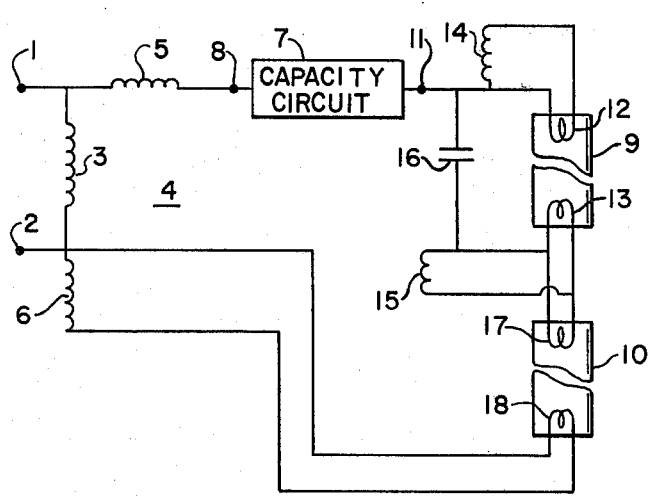
FIG. 1 is a schematic circuit diagram of a ballast circuit showing a capacity circuit in block form.

Referring now to FIG. 1, there is provided input terminals 1 and 2 adapted to receive input power for operating the ballast circuit. Input terminals 1 and 2 are further connected across primary winding 3 which is a part of transformer 4. Transformer 4 further includes secondary winding 5. Secondary winding 5 is connected to capacity circuit 7 at terminal 8. Terminals 8 and 11 are shown for illustrative purposes. Capacity circuit 7 includes a power capacitance for aiding in ballasting a pair of gaseous discharge lamps 9 and 10. Capacity circuit 7 also includes a means for substantially changing the effective capacitance of the capacity circuit 7 in response to a change in temperature. This provides for thermal regulation of the ballast circuit.

Figure 7:
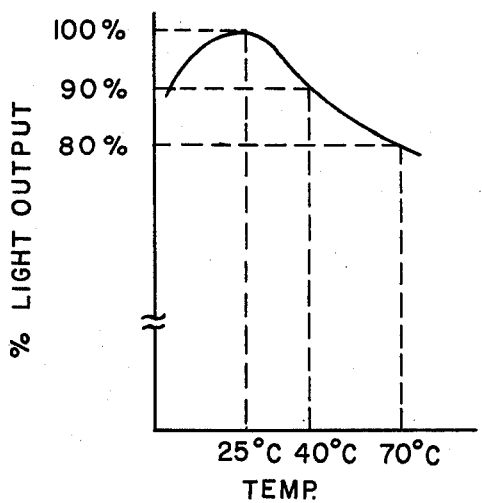
FIG. 7 is a graph showing the relationship between light output and ambient temperature near a fluorescent lamp.

The effective capacitance is the capacitance across terminals 8 and 11. This effective capacitance will substantially decrease as the temperature around capacity circuit 7 increases. This decrease in capacitance will result in an increase in net impedance of the ballast circuit. The increase of impedance results in less power consumed by the lamps 9 and 10. Since 70% of the input power is dissipated by the lamps, a substantial decrease in power will result in a substantial decrease in ambient temperature. As shown in FIG. 7, a decrease in temperature toward 25°C will result in higher light output at a fixed lamp power dissipation. The net result is that the light output will remain nearly constant while the temperature is lowered.

The capacity circuit may include, but is not limited to, any of the circuits shown in FIGS. 2 – 6. It furthermore may only include a power capacitance means itself having the characteristic of a reduction in capacitance as the ambient temperature increases. In order for this circuit to be extremely effective the decrease in capacitance should be approximately 15 to 20 percent for a change in temperature between 25° to 70°C, however lesser changes in capacitance would be also advantageous, e. g., greater than about 7 percent.

Figure 8:
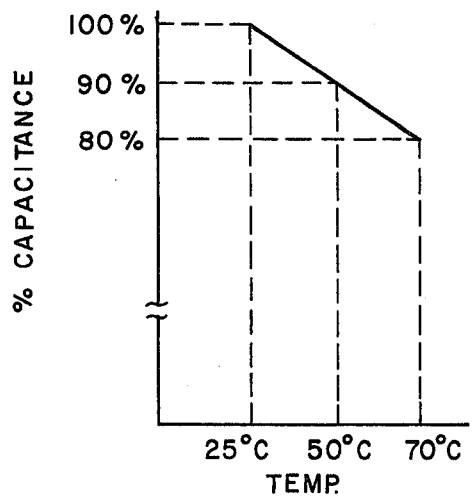
FIG. 8 is a graph showing the relationship between the capacitance and ambient temperature of a capacity compensation circuit.

The graph in FIG. 8 shows illustratively how the capacitance of the capacity circuit may decrease nearly 20 percent between 25°C and 70°C. This decrease in capacitance and the resulting increase in impedance will not substantially effect the light output of a fluorescent type lamp. Again the graph in FIG. 7 illustrates this. A fluorescent lamp whose ambient is at 70°C will generate less light than a fluorescent lamp whose ambient is 25°C, assuming the power input is constant. By using this thermal regulation technique the power dissipated by the lamp will decrease because of the increase in impedance in the ballast circuit. However, as the lamp power is decreased the temperature of the ambient around the lamp will also begin to decrease and the light output should remain about the same.

The remainder of the circuit of FIG. 1 includes gaseous discharge lamp 9 connected to capacity circuit 7 at point 11. Gaseous discharge lamp 9 has filaments 12 and 13. Filament 12 is connected to filament winding 14. Filament winding 14 is magnetically coupled to primary winding 3 to provide pre-heat for filament 12. Filament 13 is connected to filament winding 15. Filament winding 15 is also magnetically coupled to primary winding 3 to provide filament pre-heat for filament 13. Starting capacitor 16 is connected across lamp 9 at filaments 12 and 13. Lamp 10 includes filaments 17 and 18. Filament 17 is also coupled to filament 13 of lamp 9 and to filament winding 15 for providing pre-heat. Filament 18 of gaseous discharge lamp 10 is connected to filament winding 6 for providing pre-heat for lamp 12. Secondary winding 6 is connected to primary winding 3.

Figure 2:
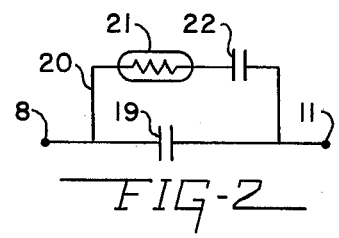
FIG. 2 is a schematic circuit diagram of one embodiment of the capacity circuit as shown in FIG. 1.

The circuit of FIG. 2 shows one embodiment of the capacity circuit which may be connected to the circuit of FIG. 1 across terminals 8 and 11. Power capacitance means 19 is connected between terminals 8 and 11 to help provide ballasting for lamps 9 and 10 and further to provide power factor correction. Circuit branch 20 is connected in parallel with power capacitance means 19. This circuit branch 20 includes termistor 21 which is a positive temperature coefficient resistor (PTC) well known to those skilled in the art. The second capacitor 22 is connected to the thermistor 21 and is also included in circuit branch 20. Thermistor 21 may be of the type which either gradually increase its resistance as the temperature increases or undergoes an abrupt resistance change whereby the capacitance means 22 is abruptly switched out of a circuit relationship with capacitor 19 when the temperature exceeds a predetermined value. With normal operating temperature of fluorescent ballast cases (90° – 95°C), capacitance means 22 is in a circuit relation with capacitance means 19 whereby the effective capacitance is relatively high.

Figure 3:
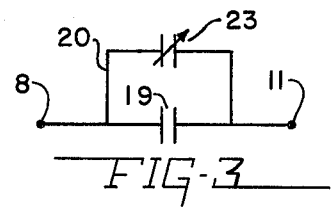
FIG. 3 is a schematic circuit diagram of another embodiment of the capacity circuit shown in FIG. 1.

The circuit of FIG. 3 is another capacity circuit and shows a power capacitor 19 having a variable ceramic capacitor 23 connected thereacross. Ceramic capacitor 23 may also be a non-variable type. Ceramic capacitors have been designed to undergo a capacitance change of up to 60 percent between 25°C and 100°C. By placing the ceramic capacitor 23 in parallel with the power capacitor 19 a reduction in lamp current of nearly 10 percent between a temperature range of 24°C and 67°C has been measured. The power dissipated by the lamp and the temperature are then lowered.

Figure 4:
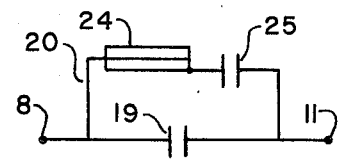
FIG. 4 is a schematic circuit diagram of still another embodiment of the capacity circuit shown in FIG. 1.

The circuit of FIG. 4 is still another capacity circuit and shows power capacitor 19 connected in parallel with a series combination of bimetal switch 24 and capacitor 25. Switch 24 may also be made of a non-metal material which is temperature sensitive. Switch 24 will be closed during low temperatures and will be opened during high temperatures.

Figure 5:
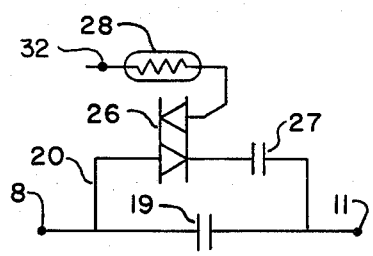
FIG. 5 is a schematic circuit diagram of still another embodiment of the capacity circuit shown in FIG. 1.

The embodiment shown in FIG. 5 shows power capacitor 19 connected in parallel with the series combination of electronic switch 26, which in this embodiment is TRIAC, and capacitor 27. A thermal responsive resistor 28 is connected to the gate of TRIAC 26 so as to switch on the TRIAC 26 at a predetermined low temperature level. When capacitor 27 is switched into the parallel circuit the overall capacitance between leads 8 and 11 increases. TRIAC 26 turns off at zero current crossing, then switching capacitor 27 out of the parallel circuit. This causes the overall capacitance to decrease. Thermistor 28 may be a well known thermal responsive switch such as a PTC resistor.

Figure 6:
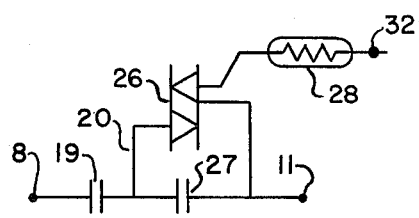
FIG. 6 is a schematic circuit diagram of still another embodiment of the capacity circuit shown in FIG. 1.

The embodiment shown in FIG. 6 shows power capacitor 19 connected in series with a second capacitor 27. An electronic switch, which is in this embodiment TRIAC 26, is connected across second capacitor 27. A thermal responsive switch 28 is connected to the gate of TRIAC 26. When a predetermined temperature is sensed by thermal resistor switch 28, TRIAC 26 turns on. This effectively switches capacitor 27 out of the circuit. Other types of capacity circuits may be utilized. For example, the power capacitor alone may be utilized whereby the internal structure of the power capacitance is made so that its capacity increases as the temperature around it decreases.

Figure 9:
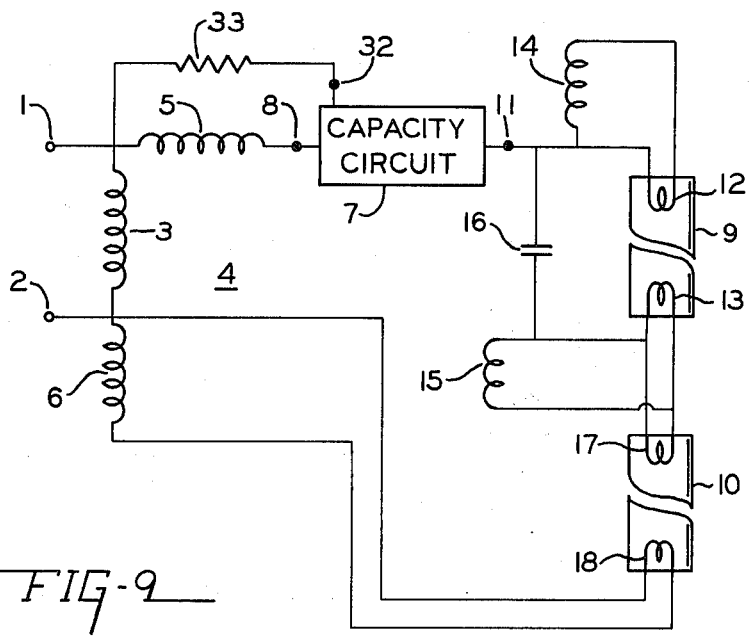
FIG. 9 is a schematic circuit diagram of the ballast circuit of FIG. 1 modified to connect the capacity circuits shown in FIGS. 5 and 6.

The circuit of FIG. 9 is essentially FIG. 1 modified to show the connection of the terminal 32 of PTC resistor 28 and thereby, the gate of TRIAC 26, with the circuit. As shown, a resistor 33 is connected serially between terminal 32 and input terminal 1.

Figure 10:
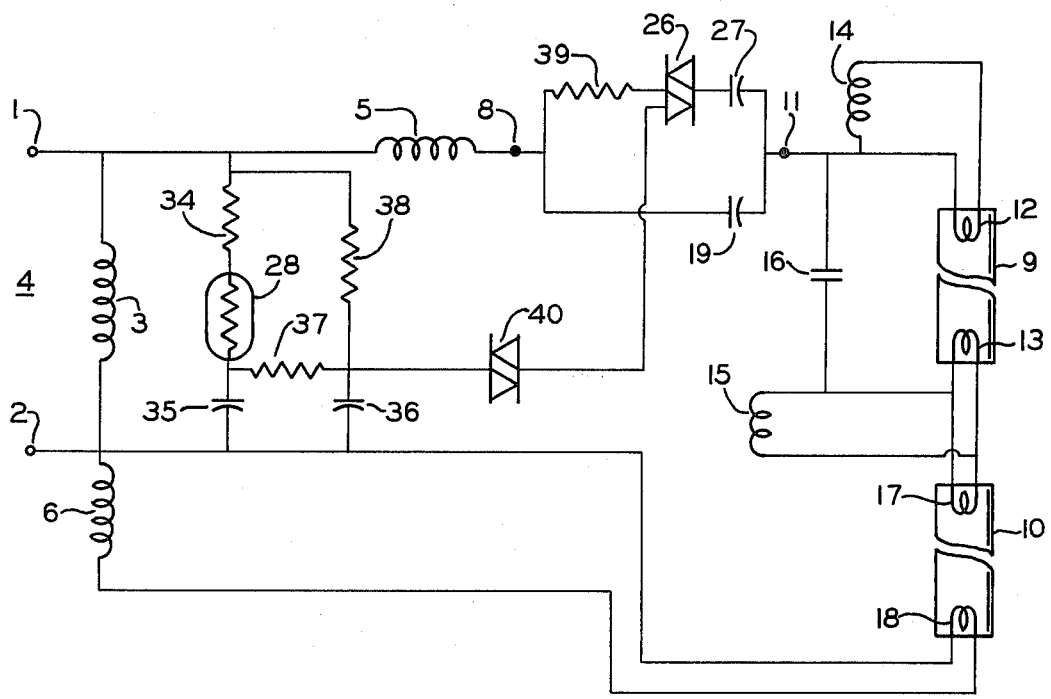
FIG. 10 is a schematic circuit diagram of the ballast circuit of FIG. 1 modified to show in detail an alternate connection of capacity circuits of the types shown in FIGS. 5 and 6.

The circuit of FIG. 10 shows an alternate and more detailed arrangement of FIG. 1 for connecting capacity circuits of the types shown in FIGS. 5 and 6 into the ballast circuit. A series combination of a resistor 34, PTC resistor 28 and a capacitor 35 is connected in parallel with primary winding 3 across input terminals 1 and 2. A series combination of a resistor 38 and a capacitor 36 is connected in parallel with the aforementioned series combination, also across input terminals 1 and 2. A resistor 37 is connected between the junction of PTC resistor 28 and capacitor 35 and the junction of resistor 38 and capacitor 36. TRIAC 26 is coupled serially with a resistor 39 and capacitor 27 across terminals 8 and 11. The gate of TRIAC 26 is connected through a diac 40 to the junction of resistors 37 and 38 and capacitor 36. Capacitor 36 and resistor 37 serve to reduce hysteresis caused by an abrupt decrease in capacitor voltage when triggering begins by charging capacitor 35 to a higher voltage than capacitor 36 and maintaining some voltage on capacitor 36 after triggering. Capacitor 35 restores some of the charge removed from capacitor 36 by the gate current pulse. Under normal operating conditions, PTC resistor 28 exhibits low resistance.

The circuit operates so that the series and parallel combination of resistor 34, capacitor 35 and capacitor 36 produces a voltage across capacitor 35 and capacitor 36. When the peak value of the voltage across capacitor 36 is sufficient in magnitude to break down the trigger device, diac 40, this breakdown is accompanied by a sudden discharge of capacitor 36 which results in a pulse of gate current into the TRIAC 26. The TRIAC is then triggered into conduction and remains in the ON state. With increase in temperature, the resistance of PTC resistor 28 becomes high and voltage across the capacitors 35 and 36 is less than the triggering device breakdown voltage and the TRIAC receives no gate current and remains in the blocking state.

A similar effect can be obtained with two power capacitors 19 and 27 serially connected as in FIG. 6. If the PTC resistor 28 operates in "low resistance mode" (under normal conditions) the TRIAC 26 will be triggered into conduction and the capacitor 27 bypassed. The nominal current is then delivered to the load. At higher operating temperatures, the resistance of PTC resistor 28 remains high and the TRIAC 26 remains in the blocking state.

A paper pyranol capacitor has been used in the prior art which undergoes, at the most, a 3% decrease in capacitance for a temperature rise between 25°C and 70°C. This small change, however, was deemed insubstantial. That is, its effect on thermal regulation was insignificant.

A pyranol filled polypropylene film dielectric capacitor has been developed which undergoes a seven or eight percent decrease in capacitance when the temperature around it goes from 25° to 70°C. This film capacitor may be used as a power capacitor. While this drop in capacitance was helpful in decreasing the overall temperature of the ballast and lamp, it is further helpful in that a savings in materials for the ballast may be realized. If one is willing to leave the temperature at a fairly high point, smaller than normal sized transformer wire may be used. Seemingly this would cause the temperature to increase but it would be compensated for by the capacity circuit. Furthermore, different types and less expensive core materials may be used which allow the ballast to heat up but again the capacity circuit would compensate for this temperature increase.

One of the most desirable ranges for thermal regulation is a 15 to 20% change in capacitance. With a 15 to 20% droop, a ballast operating with an undesirable 110°C case may be regulated back to 90° – 95°C without a significant change in light output. Another one of the benefits of a 15 to 20% reduction in capacitance is that the ballast and lamp may be operated at least within 95 percent of its normal unregulated light output between 70°C and 25°C ambient. This, again, takes advantage of the light output to temperature phenomena illustrated in the graph shown in FIG. 7 whereby the light output increases as the temperature decreases between 70°C and 25°C. It has been shown by tests on the various circuits shown in FIGS. 2 – 6 that this 95 percent light output may be achieved in some environments even though the capacitance has decreased between 15 and 20 percent.

The circuit shown in FIG. 1 and incorporating the specific capacity circuit of FIG. 2 operates in the following manner: input power is received across terminals 1 and 2. Filament windings 6, 14 and 15 are energized to pre-heat the lamp filaments. The voltage on primary winding 3 is stepped up across secondary winding 5 and the primary winding. Starting capacitor 16 is charged through power capacitor 19 and gaseous discharge lamps 9 and 10 [in this example fluorescent lamps] are started. A current flows from input terminal 1 through secondary winding 5 and power capacitance 19 and further through the filaments of lamps 9 and 10 back to other side of primary winding 3 and input terminal 2. As the ambient temperature around and in the ballast and fixture begins to rise, thermistor 21, shown in FIG. 2, begins to show more resistance. This particular thermistor switches, i.e., 50 ohms at 15°C and $10^5$ ohms at 100°C. Therefore capacitor 22 is switched out of electrical parallel with power capacitor 19. The capacity circuit therefore has less capacitance between terminals 8 and 11 at high temperature than it does at a relatively low temperature. This decrease in capacitance results in an increase in overall circuit impedance. Capacitance is related to impedance by the formula $$Z = \frac{1}{KC}.$$

Since the impedance is increased, the current through the lamps and therefore the power dissipated by the lamps is decreased. With less power being dissipated by the lamps the overall temperature in the fixture and near the ballast will begin to decrease. This combined decrease in lamp power and decrease in ambient temperature will allow the light output to remain nearly constant. As the temperature decreases sufficiently, the thermistor 21 will sense that the temperature is decreasing and switch capacitor 22 back into the capacity circuit. This switching of capacitor 22 in or out of the capacity circuit results in the thermal regulation of the ballast circuit.

A circuit has been built with the components shown in FIGS. 1 and 2 having the following set of values:

| | | |
|---|---|---|
| Capacitor 19 | - | 3.4 MFd |
| Capacitor 22 | - | 0.4 MFd |
| Capacitor 16 | - | 0.05 MFd |
| PTC Resistor 21 | | |
| $R_{25}$ C | - | 50 Ohms |
| $R_{100}$ C | - | $10^5$ Ohms |
| Primary Winding 3 | - | 823T, dia..0169" |
| Secondary Winding 5 | - | 1442T, dia..0164" |
| Filament Winding 6 | - | 28T, dia..0169" |
| Filament Winding 14 | - | 28T, dia..0169" |
| Filament Winding 15 | - | 28T, dia..0169" |
| Lamp 9 | - | 40W rapid start fluorescent |
| Lamp 10 | - | 40W rapid start fluorescent |

A circuit has been built with the added components shown in FIG. 10 having the following set of values:

| | | |
|---|---|---|
| Capacitor 27 | - | 0.8 MFd |
| Capacitors 35, 36 | - | 0.1 MFd/200VDC |
| Resistor: 34 | - | 60 K Ohms/1/2W. |
| 37 | - | 50 K Ohms/1/2 W. |
| 38 | - | 100 K Ohms/1 W. |
| 39 | - | 100 Ohms/1/2 W. |

From the foregoing description of the illustrative embodiments of the invention, it will be apparent that many modifications may be made therein. For example, various types of capacity circuits may be used whereby the thermal characteristics of the ballast circuit are substantially regulated. It will be understood, therefore, that these embodiments of the invention are intended as an exemplification of the invention only and that this invention is not limited thereto. It is understood, therefore, that it is intended in the appended claims to cover all modifications that fall within the true spirit and scope of this invention.

What I claim as new and desire to secure a Letters Patent of the United States is:

1. A ballast circuit for regulating the current in at least one gaseous discharge lamp over a range of ambient temperatures comprising:
    a pair of input terminals for connecting said ballast circuit to a source of power;
    a transformer having primary and secondary windings;
    said pair of input terminals being connected to opposite ends of said primary winding;
    means for connecting said ballast circuit to the at least one lamp;
    a capacity circuit connected between said secondary winding of said transformer and said means for connecting said ballast circuit to the at least one lamp;
    said capacity circuit including a power capacitance means;
    said capacity circuit including means adapted to substantially decrease the effective capacitance of said capacity circuit in response to a predetermined increase in the temperature to which said ballast circuit is subjected and to substantially increase the effective capacitance of said capacity circuit in response to a predetermined decrease in the temperature to which said ballast circuit is subjected, whereby said ballast circuit is thermally regulated with no more than an insubtantial change in light output of the at least one lamp.

2. A ballast circuit as set forth in claim 1 wherein said capacity circuit further includes a second capacitance means associated with said power capacitance means, and a switch means for effectively switching said second capacitance means in and out of an electrical relationship with said capacity circuit.

3. A ballast circuit as set forth in claim 2 wherein said switch means is a positive temperature coefficient resistor connected in series with said second capacitor; said series arrangement being connected in parallel with said power capacitance means.

4. A ballast circuit as set forth in claim 3 wherein said positive temperature coefficient resistor is substantially linear resistance with respect to temperature over a predetermined temperature range.

5. A ballast circuit as set forth in claim 3 wherein said positive temperature coefficient resistor is of the type which abruptly and substantially changes resistance at a predetermined temperature.

6. A ballast circuit as set forth in claim 2 wherein said switch means is a thermal responsive switch; said thermal responsive switch being connected in series with second capacitance means; said series arrangement being connected in parallel with said power capacitance means.

7. A ballast circuit as set forth in claim 6 wherein said thermal responsive switch is a bi-metal switch.

8. A ballast circuit as set forth in claim 2 wherein said switch means is an electronic switch having a control terminal; said electronic switch being connected in series with said second capacitance means; said series combination being connected in parallel with said power capacitance; a thermal responsive device connected to said control terminal of said electronic switch for controlling initiation of said electronic switch.

9. A ballast circuit as set forth in claim 2 wherein said switch means is an electronic switch having a control terminal; said second capacitance being connected in series with said power capacitance means; said electronic switch connected in parallel with said second capacitance means, and a thermal responsive device being connected to said control terminal of said electronic switch means for controlling initiation of said electronic switch.

10. A ballast circuit set forth in claim 1 wherein said capacity circuit includes a ceramic capacitor connected in parallel with said power capacitance means; said ceramic capacitor being the type whose capacitance decreases as the temperature increases.

11. A ballast circuit as set forth in claim 1 wherein the change in overall capacitance of said capacity circuit is greater than 15% with a corresponding change in light output from the lamp of less than 5%.

12. A ballast circuit for regulating the current to at least one gaseous discharge lamp over a range of ambient temperatures comprising: a pair of input terminals for connecting said ballast circuit to a source of power;
    a transformer having primary and secondary windings, said primary winding being connected to said pair of input terminals;

means for connecting said ballast circuit across the at least one lamp;

a power capacity circuit connected between said secondary winding of said transformer and said means for connecting said ballast circuit to the at least one lamp; said power capacity circuit including means adapted to substantially change the effective capacitance of said power capacity circuit in response to a predetermined change in the temperature to which said ballast circuit is subjected for substantially changing the overall impedance of said ballast circuit so that said ballast circuit is thermally regulated with no more than an insubstantial change in light output of the at least one lamp.

13. A ballast circuit as set forth in claim 12 wherein the means for substantially changing the capacitance of said capacity circuit will cause at least a 15 percent change in capacitance in response to a predetermined change in temperature.

14. A ballast circuit as set forth in claim 12 wherein said capacity circuit includes a thermal responsive switch means and a second capacitance means;

said second capacitance means associated with said thermal responsive switch means and said power capacitance means whereby said thermal responsive switch means controls the overall capacitance of said capacity circuit.

15. A ballast circuit for regulating the current in at least one fluorescent lamp over a range of ambient temperatures comprising: a pair of input terminals for connecting said ballast circuit to a source of power;

a transformer having primary and secondary windings;

said pair of input terminals being connected across said primary winding;

said secondary winding being connected to said primary winding; a capacity circuit including a power capacitance, a second capacitance, and a positive temperature coefficient resistor;

said power capacitance being connected between said secondary winding and the at least one fluorescent lamp;

said positive temperature coefficient resistor being connected in series with said second capacitance;

said series combination being connected in parallel with said power capacitance;

whereby the effective capacitance of said capacity circuit may be decreased by at least 15% in response to a predetermined increase in ambient temperature without a corresponding substantial decrease in light output of the fluorescent lamp.

\* \* \* \* \*